United States Patent [19]

Colbert

[11] Patent Number: 5,594,806
[45] Date of Patent: Jan. 14, 1997

[54] KNUCKLE PROFILE INDENTITY VERIFICATION SYSTEM

[75] Inventor: Charles Colbert, Yellow Springs, Ohio

[73] Assignee: Personnel Identification & Entry Access Control, Inc., Yellow Springs, Ohio

[21] Appl. No.: 267,584

[22] Filed: Jun. 20, 1994

[51] Int. Cl.$^6$ .................................................. G06K 9/00
[52] U.S. Cl. ............................ 382/115; 382/116; 382/209
[58] Field of Search .................................... 382/115, 209, 382/221, 222, 116, 117, 118, 119, 190, 192, 195, 203, 217, 218, 219, 220

[56] References Cited

U.S. PATENT DOCUMENTS

| | | | |
|---|---|---|---|
| 3,639,905 | 2/1972 | Yaida et al. | 382/115 |
| 4,607,385 | 8/1986 | Maeda | 382/209 |
| 4,736,203 | 4/1988 | Sidlauskas | 382/115 |
| 5,073,950 | 12/1991 | Colbert et al. | 382/115 |
| 5,335,288 | 8/1994 | Faulkner | 382/115 |

FOREIGN PATENT DOCUMENTS 9008366  7/1990  WIPO ..................... 382/115

OTHER PUBLICATIONS

Jungbluth, "Knuckle Print Identification" (Abstract), *Journal of Forensic ID*, vol. 39, No. 6, (Nov.–Dec. 1989), pp. 375–380.
Publisher: BRP Publications, "New Generation Hand Geometry: Looking For The Right Fist"–Corporate Security, Jul. 28, 1995, vol. 21, No. 15, (Product Description)–(Pideac Inc.), Yellow Springs, OH. (No Aurthor or Page Number).

*Primary Examiner*—Leo Boudreal
*Assistant Examiner*—Bijan Tadayon
*Attorney, Agent, or Firm*—Joseph G. Nauman

[57] ABSTRACT

A method and apparatus for verifying/identifying a person based on contour of the knuckles of at least one hand, e.g. a digitized waveform unique to each individual. At an Enrollment Station a microcomputer is connected to a video camera (with CCD array). A candidate user grasps and turns a grip handle on the apparatus, thus positioning a fist before a viewing window and activating the camera to scan the fist and generate a contour of the user's knuckle profile. User's data comprises a knuckle profile of fist(s), an assigned PIN, and optionally, information such as user's name, bank ID number, Social Security Number, and access restrictions. User's data may be stored as an electronic waveform profile (template) in an ID card, and simultaneously in a master database containing data of all authorized users in a guarded system (factory, retail store, bank customers, computer data files). Similar apparatus is installed at each Guarded Station (a door, turnstile, gate, ATM, etc.). To gain access or transaction approval at a Guarded Station, the user inserts his ID card into a reader to retrieve the template from the card and store it temporarily for use in a digital signal processor; the system may also retrieve the template from master database. As at the Enrollment Station, the user generates his knuckle profile by turning a grip/handle into position before a camera viewing window.

19 Claims, 3 Drawing Sheets

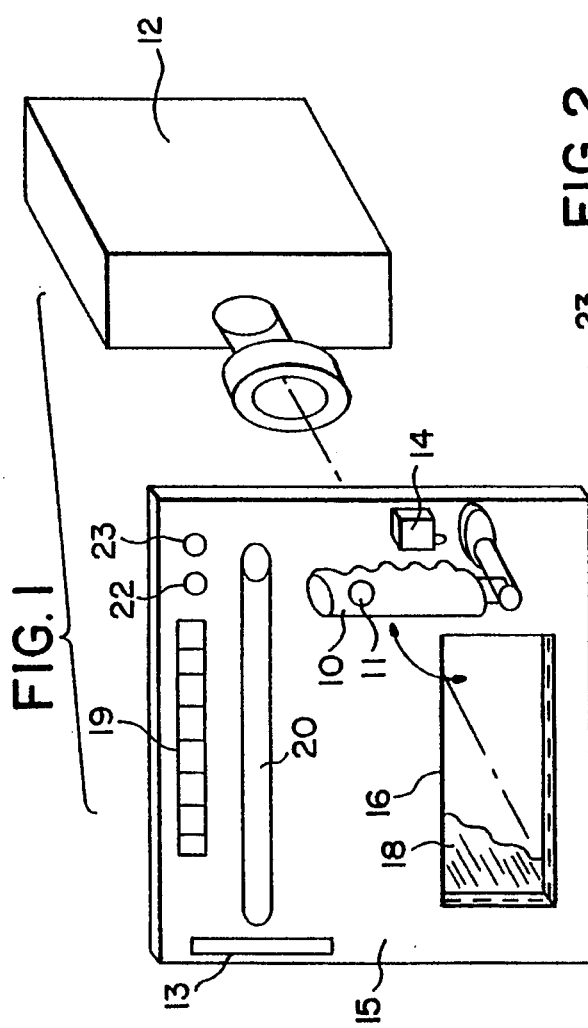
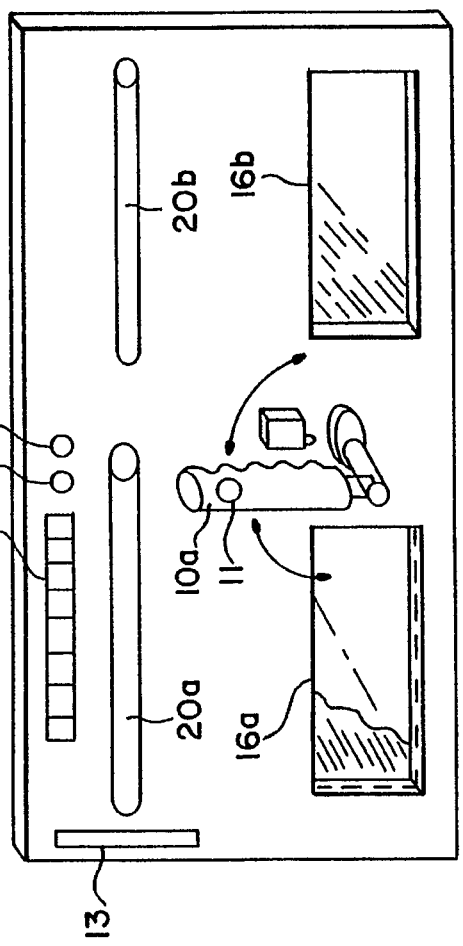

KNUCKLE PROFILE INDENTITY VERIFICATION SYSTEM

FIELD OF THE INVENTION

Distinguishing characteristics of this invention are that: it uses the fingers in grip configuration rather than extended; grasping and turning a handle to gain access are natural motions associated with opening a door; the user is not aware of exactly how he is being observed, whereas other hand geometry apparatuses require finger placement in a prescribed orientation.

BACKGROUND OF THE INVENTION

Numerous biometric hand geometry inventions exist or have been proposed for verifying the identity of persons. Among these are: finger shape, finger length (and length ratios), finger width, palm size, hand size, finger creases, fingerprints, finger indent points, and blood vessel patterns on the back of the hand. Each method has its drawbacks. The patent literature describes numerous forms of hand geometry apparatus which generally use guides (e.g. posts, grooves, raised plates) to physically constrain the hand and fingers into prescribed positions which are not user friendly. The present invention stems from work to develop an apparatus, see U.S. Pat. No. 5,073,950 issued 17 December 1991 and assigned to the assignee of this application, which relies on measuring length, width and shape (contour) of four fingers.

To avoid physical restraints, such as guide posts, that patented apparatus uses a mathematical algorithm to realign or normalize the images of the four fingers to correct for differences in finger spread between the template image and the profile image, as defined below. While this normalizing or remapping process is effective, to the great relief of the users, the computational overhead can cause a delay of several seconds in the transaction (decision) time. This limits the apparatus to low traffic applications. A desire to avoid forcing the fingers into awkward positions, and to avoid mathematically remapping the finger images, gave rise to the present invention. The decreased and simplified verification time results in a system usable in high traffic applications.

The novel system (method and apparatus) described here can prevent an unauthorized individual from gaining access to a restricted zone. It also can prevent an imposter from fraudulently transacting business by posing as another person. And, this system can prevent a computer "hacker" from invading a confidential database. The following are potential applications:
1) verification of user in connection with credit and debit cards, smart cards, proximity cards, bank cards (e.g. for automatic teller machines), or electronic funds transfer devices;
2) time and attendance clocks for payroll and job cost accounting;
3) health and welfare services, including food stamps;
4) passport control and verification, border patrol, alien work permits;
5) social security cards;
6) driver licenses;
7) vending machines; control of secured zones or information (military, industrial, banks, computer databases);
8) education purposes (e.g., employee, student ID cards for cafeteria, bookstore, and exam attendance uses);
9) membership ID cards;
10) probationer check-in kiosks, or prisons;
11) vehicle anti-hijacking devices;
12) transportation ticket dispensers;
13) parking lots, garages, and toll booths;
14) airport security; and
15) gambling casinos.

The same ID card can serve several of these applications.

SUMMARY OF THE INVENTION

The premise of the system provided by this invention is that the knuckle contour of either hand comprises a sinuous pattern or waveform, herein called a profile, which is essentially unique to each individual. Although it is possible that two different persons could have the same profile, such an occurrence is extremely unlikely. The apparatus part of the invention consists of an electronic video camera to capture the image of the user's fist, a digital signal processor DSP including a circuit operating on the camera's output to extract the digitized knuckle profile, and a device to store such profile for later reference in a database or in an ID card. Once stored, the reference profile is called a template. Also stored along with the user's template may be other data pertinent to the user (for example name, Social Security Number, bank ID number, personal identification number [PIN]).

To secure transaction approval, or to gain access to a secured zone (Guarded Station), the user presents a fist, whereupon the apparatus generates the user's profile for matching to the user's previously stored template. If the match quality meets or exceeds a pre-determined level (match score), the user is accepted for transaction, or granted access. In some highly secure applications, apparatus may require that the user be accepted only after presenting both fists in turn, to match with corresponding dual templates. Another embodiment requires that two different persons be verified and accepted, in combination, e.g., a user and a security officer.

Searching for the user's template(s) may vary in different system configurations. The user's template may be stored in a database or on a card (e.g., a magnetic stripe card, or a smart card). Other data pertinent to the user may also be stored on the card or in the database, such as name, bank account number, Social Security Number, or a PIN, depending on the application. The digital signal processor (DSP) generates a knuckle profile from the video camera output, and a comparator matches the profile to the previously stored template. The comparator (which may be in a microcomputer) uses Pearson's regression analysis formula to assess the quality of the match. The resulting match score, expressing the degree of congruence between the profile and template, is compared to a minimum acceptable threshold score and results in either an Acceptance or a Rejection signal or message.

In a modification of the above described system, the user enters his PIN on a keypad which in turn initiates the profile capture and analysis, resulting in either verification and acceptance, or rejection.

In yet another embodiment, templates of all eligible users are stored in an "on-line" database. The system may use a "riffle mode" wherein the user's profile is generated at the Guarded Station and stored in a temporary buffer in the DSP, where that profile is rapidly compared in sequence to each template in the database. A computer algorithm selects the template that yields the highest match score, thus identifying user. The user's match score must equal or exceed the threshold score for the user to be accepted. The "riffle mode"

is practical only because modern computer cycle times are in the order of nanoseconds and the user's profile and the database templates consist of only a few bytes. So, each match score computation takes only few microseconds, which means that the search of a database containing several thousand templates will require only one or two seconds. This mode is attractive because the user need not carry a card or remember his PIN, but only know how to turn a handle.

BRIEF DESCRIPTION OF THE DRAWINGS

FIG. 1 is a schematic perspective view of the preferred form of apparatus provided by the invention;

FIG. 2 shows a modified apparatus;

DESCRIPTION TO THE PREFERRED EMBODIMENT

Figure 3:
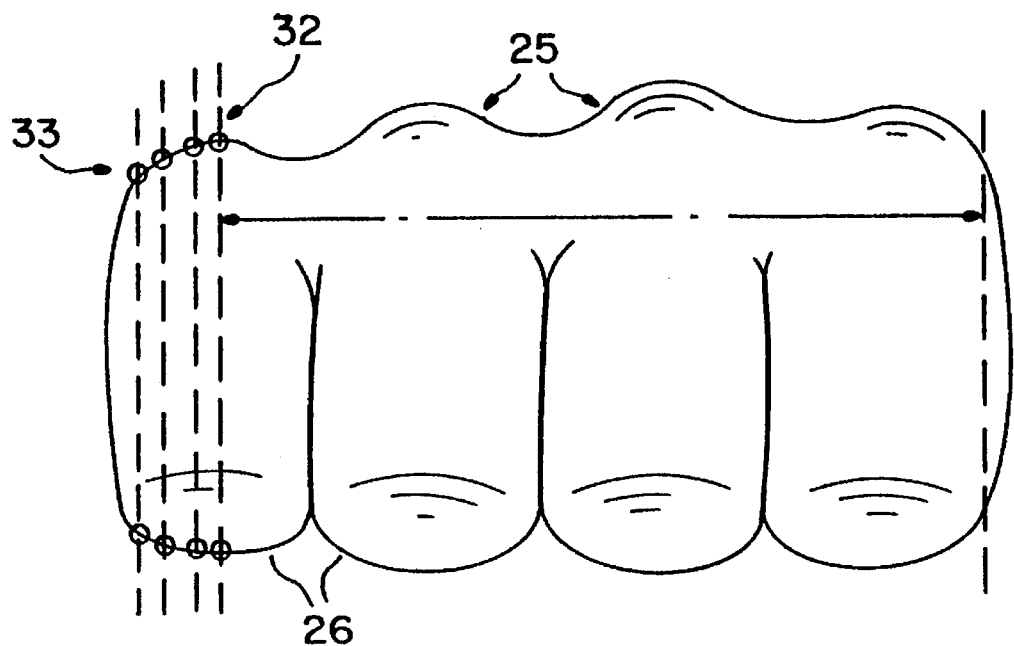
FIG. 3 is a diagram of the head-on view of knuckles of one hand, in the grip configuration, illustrating the manner of scanning the knuckle profile.

Referring to FIG. 1, the apparatus portion of the system is mechanically and electronically simple, accurate and reliable. Its low cost makes it economically attractive for large-scale commercial, industrial, and government/military uses. Since this invention uses knuckles rather than spread fingers, mechanical means (posts, grooves, or guide plates) are not needed to position the hand and fingers. Likewise, normalizing computations are not required because knuckles have no features to realign, and a grip handle 10 (e.g., a bicycle grip) fixes the fist orientation, and initiates system operation when the handle is turned to a stop.

The method of capturing the knuckle image, extracting and storing the profile (knuckle template) for later reference is accomplished by a simple CCD (charge coupled device) black-and-white video camera 12 trained on the fist in grip configuration, preferably head-on, or alternatively from above the wrist. A vertical metal face plate 15 with a window cut-out 16 serves as a screen to separate the camera from the fist. When the user grasps grip handle 10 with either hand and turns the handle to the horizontal position (counterclockwise as viewed in FIG. 1) the knuckles are in the correct position to be viewed by camera 12 through window 16. This action actuates a switch 14 (e.g., a cam-operated switch) to generate a signal that the fist is in position for capturing its image by the camera and for generating the knuckle profile. The window opening is covered by an infrared (IR) filter 18 so only IR light will form the knuckle image on the camera's CCD array, thereby excluding stray ambient light, thus increasing the contrast between the fist and its surroundings.

Figure 5:
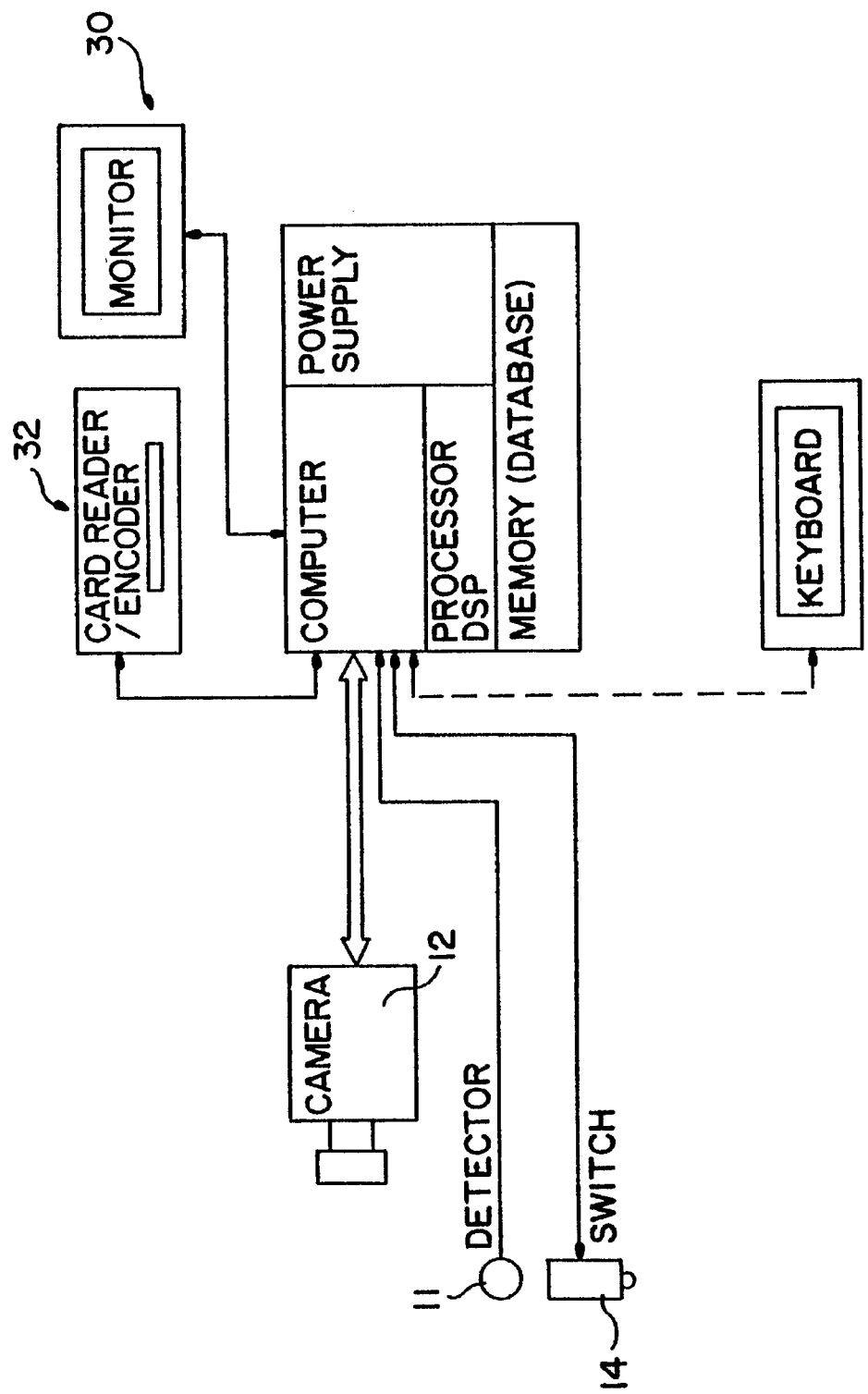
FIG. 5 is a block diagram of the over-all system.

An overhead tubular incandescent lamp 20, mounted on the face plate 15, provides uniform illumination of the knuckles 25 and the four proximal phalanges 26 (see FIG. 3) as the camera views the fist head-on. The lamp 20 is continuously energized at low voltage so as to produce predominantly red light and to achieve long operating life. A video monitor 30 (FIG. 5), when connected for alignment and maintenance purposes, captures the head-on fist image, which appears bright against a dark background. Since the goal is to generate the knuckle profile, the camera scanning is arranged so that the scan lines 32 run from the proximal joints 26 up the fingers to the knuckles 25. This differs from conventional orientation where a video raster scans consecutive horizontal lines, progressing downward, as one would read a printed page.

The reason for this scan orientation is that the scan lines, starting just below the proximal interphalangeal joints will register dark at first until they encounter the brightly lighted fist. When the scans reach the knuckles (and thus pass beyond the fist) there is an abrupt switch to dark. Thus, each scan line will have two transitions: one at the proximal joint 26 and one at the knuckle 25.

The raster scan video signal from camera 12 is fed to a microprocessor based computer (a microcomputer), or equivalent, which includes a digital signal processor. A conventional edge detector circuit in the DSP (FIG. 5) will mark the first transitions (dark to light) as points 26 on the joint profile, and the second transitions (light to dark) as points 33 on the knuckle profile. Thus, there will be some 400–500 points describing these profiles, corresponding to the number of lines in the video scanning raster. Use of the joint profile is an available option which can be invoked to decrease the error rate by resorting to this second independent profile.

Also stored along with the user's template may be other data pertinent to the user (for example name, social security number, bank ID number, PIN). For example, where the system is used to guard a secured zone, to gain access the user presents the fist (or both fists in sequence), whereupon the apparatus generates the user's profile(s) for matching to the user's previously stored template(s). If the match quality meets or exceeds a predetermined level (match score), the user is granted access.

Thus, the apparatus is simpler than other biometric hand geometry devices. Rings, partially amputated or missing fingers, even missing knuckles, or finger nail variations, do not affect the knuckle profile. Some hand geometry devices require the presence of four fingers, and they must resort to special means to accommodate anomalous conditions. The knuckle profile method does not presuppose the usual existence of four peaks; three can do as well. Even two peaks may suffice because the system is merely checking for congruence between two waveforms of arbitrary shape; knuckle profile undulations are much more pronounced than those of the finger profile. Owing to the thin soft tissue cover the knuckles are less susceptible than the fingers to changes due to fluid retention, weight gain or aging.

Many hand geometry systems, if not most, are designed primarily for either the left or right hand, but the apparatus according to this invention can be used just as easily by either hand. The configuration of grip/handle 10 fixes the position of the hand more easily than the posts or grooves used in other hand geometry devices. A grip configuration is more natural than a spread-finger orientation. To deter use of a non-living fist surrogate, a microphone or infra-red detector 11 can be installed within grip handle 10 to detect a pulse. The grip configuration also avoids difficulties encountered in apparatuses using the flat hand/extended fingers configuration, such as: loss of fingers; damage to fingers; finger swelling and changes with weight or age; forced finger orientation through mechanical means or computed reorientation; finger nail length variations; finger rings; lateral misalignment of the profile and template; and social reluctance to spread fingers as if submitting to fingerprinting.

Referring to FIG. 1, when grip handle 10 has been turned counterclockwise to the horizontal position, the camera 12 views the fist (FIG. 3) through window 16 and IR filter 18 in the face plate 15. The handle is attached to a pivoted shaft rotatable in face plate 15, and normally vertical in the rest position, as shown. When grasped and rotated 90° counter-clockwise to the horizontal position, the handle engages a mechanical stop (not shown) to prevent the handle from travelling beyond horizontal. The handle closes a cam operated switch 14 which activates the camera 12. An infra-red filter 18 positioned in the window passes only red light from the fist to the camera, diminishing unwanted ambient light and increasing the contrast of the knuckle image. Above the incandescent lamp is the bright 24-character message panel 19 which can read REJECT or ACCEPT, or optionally greet the user by NAME. A pair of optional red and green panel lights 22 and 23 are located above window 16, which lights can also indicate rejection or acceptance.

For greater user convenience and to achieve a lower error rate via more rigorous scrutiny, a dual fist version of the apparatus (FIG. 2) and system can consist of a single vertical handle 10A rotatable to the horizontal in either direction, aligned with windows 16A or 16B. The fist is illuminated from above either by lamp 20A or lamp 20B. In such a version, optical elements allow the camera to view the right or left fist depending on which way handle 10A is turned. A change in the matching algorithm requiring the user to achieve a successful match using, in turn, first the right and then the left hand, can offer a decrease in the error rate.

A modified dual identity embodiment can be configured to require that two different (authorized) persons must be successfully accepted before a crucial action can take place (firing a cannon, launching a missile, opening a safe); this is sometimes known as the "two-man rule." Of course, a non-dual embodiment can initiate the same action, both merely require an appropriate algorithm, and no significant change in the apparatus is needed.

The apparatus portion of the system is mechanically and electronically simple, accurate and reliable. Its low cost makes it economically attractive for large-scale commercial, industrial, and government/military uses. Since this invention uses knuckles rather than spread fingers, mechanical means (posts, grooves, or guide plates) are not needed to position the fingers. Normalizing computations are not required because knuckles have no features to realign, and a grip handle (e.g., a bicycle grip) fixes the fist orientation, and preferably is used to initiate system operation.

If the apparatus uses only the knuckle waveform for ID verification, it is depending on only a single pair of waveforms to perform the verification. Experience with the apparatus cited in U.S. Pat. No. 5,073,950 shows that the larger the number of match pairs, the smaller the chances for error. This is why that apparatus was based on matching four finger three ways (finger length, width, and shape). For this reason the present invention takes advantage of the joint profile, especially when the joint profile is available with only a minor overhead penalty. No new circuitry is required, but simply a change in the algorithm to extract the additional waveform. Whether incorporation of the joint profile waveform is warranted depends on the error rate specifications of a particular application.

About one point per millimeter at the knuckle will adequately describe the shape of the knuckle profile. A 4" (100 mm) wide fist is adequately depicted by 100 points rather than 400 or 500 points. Too many data points simply increase the computation time. Therefore, a line counter circuit can be installed and used to record data points only every fourth or fifth scan line.

A preferred comparison formula to determine the degree of congruence between a profile and a template is $r^2$, Pearson's coefficient of determination. For a perfect match, $r^2=1.0000$. Moving the decimal point for convenience, a perfect match yields a match score of 100.00. Such a high score is almost never achieved, but usually the score lies between 97.00 and 99.00 using the system of the present invention. A typical threshold score from prior experience is about 96.50, which must be equalled or exceeded by the match score for the user to "pass" the biometric test. In any test of this type there is always a chance that the device will make an error, by accepting an unauthorized person (Type II error), or rejecting an authorized person (Type I error). If a military or other high security facility wants to be sure not to accept an unauthorized person, it will set the threshold score to a high value and run the risk of rejecting an authorized person. So, setting of the threshold score can be made adjustable and depend on the particular application of the system.

A method of verifying the identity of an individual by generating and storing a template which describes the shape of the individual's four knuckles, much like contouring a chain of tiny mountains, and by comparing this shape with a profile generated at a Guarded Station. If the template and profile shapes match to an acceptable degree, the identity is judged to be verified and the person is granted entry (or transaction) access.

It is possible to generate an even smaller biometric discriminant based on the knuckle profile by recording only the locations of the peaks of all four knuckles and measuring the distances between the first peak and each of the other three peaks. There would be three such numbers to the nearest 0.1 millimeter. A very large male fist would be about 6" (150 mm) wide. Hence, the largest decimal number to record would be about 1500, or an 11 bit binary number. Alternatively, a discriminant of even smaller size can be made by recording only the number of points separating each peak from its neighbor. Thus the location of only four points summarizes the salient features of the erstwhile 100-point profile, and another three points corresponding to the valleys can add to the discriminating power of the apparatus. This software change reduces the profile shape to a saw-tooth. The penalty of decreasing the profile size by quantizing the profile shape will be an increase in the Type I and Type II error rates. But such increases may well be tolerated in certain applications. The benefit can be a substantial decrease in computation time.

A small template size makes possible the rapid riffle mode previously described, because a very large number of match scores must be computed as the database is searched to find the user's template. A Type II error could occur if the match score from a comparison of the user's profile with a another user's template in the database exceeds the threshold score. In lieu of a magnetic stripe card or smart card, the apparatus can store the templates of the authorized users in an internal or remote database and retrieve any desired template by means of a keypad, proximity card, or touch screen.

The riffle mode described above does not require use of any device or card or PIN to retrieve a template. The user does not need to carry a card or remember a PIN. The user simply grasps the handle 10 and turns it to the horizontal. The user's profile thus generated is recorded in a temporary buffer in the DSP where it is rapidly compared in sequence to each template in the database.

Knuckle profiles exhibit by their very nature broad peaks and valleys and are therefor prone to yield equivocal locations. A method to sharpen up the waveforms is to apply a convolution algorithm called autocorrelation, and then extract peak and valley locations. The method functions as follows:

1) Copy the portion of the knuckle waveform that corresponds to the second phalanx (index finger);
2) Superimpose the copy over the portion of the waveform that corresponds to the fifth phalanx (pinky);
3) Compute $r^2$, then shift the copy in one point increments computing $r^2$ at each shift to produce the autocorrelation waveform.

The reference point (at $r^2=1.0$) occurs where the copy rests on its parent. The autocorrelation waveform will reveal the precise number of points that separate each peak and valley from the reference point. Autocorrelation curve data of all authorized persons can be stored in an auxiliary database, and in a second auxiliary database in the form of peak/valley locations, thus greatly reducing the template size, although at some sacrifice of the actual shapes of the peaks and valleys. These two auxiliary databases can be used to great advantage in the riffle mode, where high speed template matching is essential. Suppose that the riffle mode now finds three probable matches out of 1500 persons in the peak/valley database. It would be easy then to refer to the (parent) template database so as to find out which one of the three is the user being sought. This procedure, known as "triage", can greatly speed up the search of a large database.

FIG. 3 (preferred embodiment) shows what the camera 12 sees when viewing the fist head-on. The image appearing on the monitor 30 is bright up to the knuckles and dark beyond. The raster scan lines 32 are shown schematically as dotted lines as they progress from the proximal finger joints upward toward the knuckles. As each scan line arrives at the knuckle boundary a transition from bright to dark occurs abruptly, marking one point 33 on the knuckle profile. Likewise at point 34 occurs at each dark to bright transition on the proximal joint profile.

Figure 4:
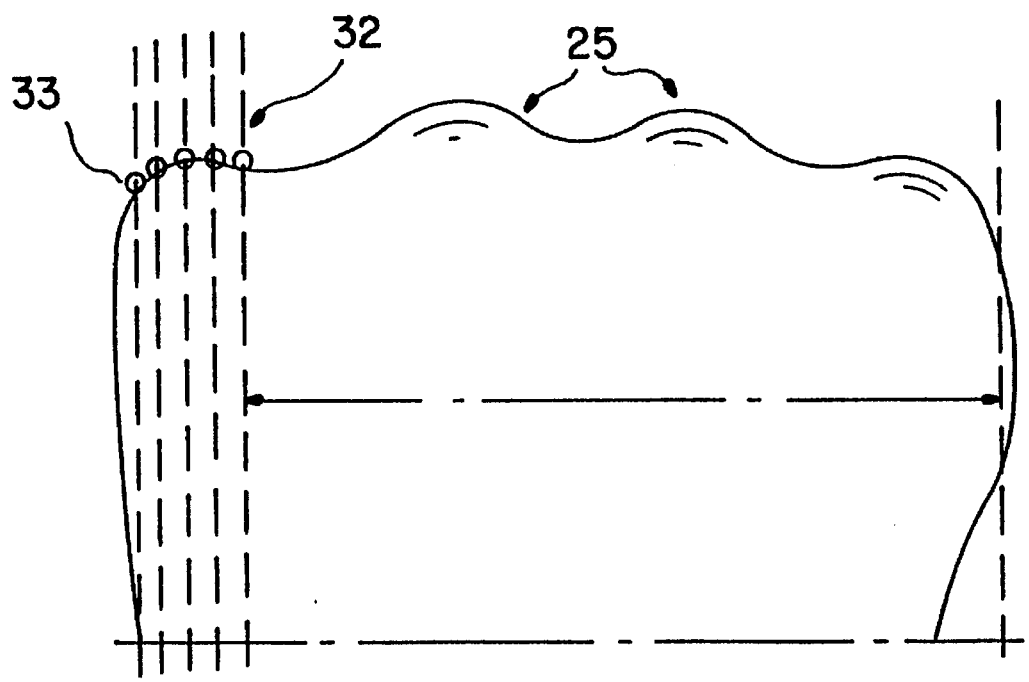
FIG. 4 is a diagram of an alternate configuration, using an overhead view of knuckles with the camera viewing the back of the hand.

FIG. 4 (another embodiment) shows what the camera sees when viewing the illuminated fist from above the wrist joint, using a modified camera orientation. The raster scan lines 32 again are shown schematically as dotted lines as they progress from the wrist toward the knuckles.

An optional speaker, buzzer, or klaxon (not shown) can be mounted behind face plate 15 to signal audibly a REJECT decision. FIG. 1 shows an optional pair of red and green lights 22, 23 on the face plate to display an accept or reject message. Mounted on the back of the face plate 15 is a card reader/encoder 32 (FIG. 5), and on the front of face plate 15 is slot 13 to accept a user's ID card. In other versions there may be no card reader/encoder or slot, but a keypad instead, to enter PIN information or the like.

TYPICAL OPERATION OF THE SYSTEM Following are the steps to enroll a user:

1. a security officer places a formatted magnetic stripe or smart card in the reader/encoder slot 13, and instructs a new user to grasp and turn the grip handle 10 counter-clockwise until it reaches a mechanical stop at its horizontal position;
2. this action triggers the camera to capture the fist image;
3. the scanned area of the fingers, from the proximal joints up to the knuckle boundary is illuminated by lamp 20, and camera 12 records the fist image head-on through window 16 and IR filter 18; scan lines 32 are parallel to the fingers (FIG. 3), originating at the proximal finger joints 26 and progressing upward across the knuckles 25; each scan line is therefore bright until it reaches the knuckle boundary whereupon it abruptly goes dark;
4. an edge detector circuit in the DSP marks this boundary as a series of points 33 delineating the knuckle profile;
5. a video scanning raster of some 400–500 lines provides a surfeit of points to define the profile, however to reduce the number of points to a spacing of one millimeter at the fist, a line counter circuit can select every fifth line as sufficient to delineate the profile;
6. the profile of four peaks is stored as a template on a card or in a database along with an assigned PIN; other pertinent data may also be stored on the card (or in an internal or remote memory), e.g., user's name, bank account number, Social Security Number, depending on the particular application.

To gain approval, or access at a Guarded Station, with a card version:

1. the enrolled user tests his newly made card by inserting it into the card reader/encoder slot 16;
2. the user grasps the vertical grip handle 10 and turns it to the horizontal position, thus orienting the fist in the correct position for the camera to capture the knuckle image;
3. the DSP receives each scan line from the camera (typically of 100–200 data points, depending on the size of the user's fist), generates the knuckle profile, and compares it to the previously stored template;
4. a comparison routine using Pearson's regression analysis formula ($r^2$) assesses the quality of the match; value of $r^2$ thus obtained is a measure of the degree of congruence between the profile and the template;
5. if approval or access is granted, the green panel light 23 will glow and/or the message panel will display ACCEPT, or WELCOME MS. SMITH, depending on the design of a particular system;
6. if access is denied, the red panel light 22 will glow and/or the message panel will display REJECT, and (optionally) an alarm (tone, buzzer, klaxon) may sound.

The methods herein described, and the forms of apparatus for carrying these methods into effect, constitute preferred embodiments of this invention. It is to be understood that the invention is not limited to these precise methods and forms of apparatus, and that changes may be made in either without departing from the scope of the invention, which is defined in the appended claims.

What is claimed is:

1. A biometric geometry method for preparing a unique identity characteristic of a potential user based on at least one of the user's fists placed in grip configuration by creating and storing as a template a reference profile of the undulating peaks and valleys of a knuckle pattern unique to each user, the method comprising the steps of a) positioning the user's knuckle contours of said one fist,
   b) capturing an image of the knuckles,
   c) extracting the knuckle profile from the captured image,
   d) digitizing the knuckle profile,
   e) storing the digitized profile as a template in a storage medium, and
   f) sharpening the peaks and valleys of the knuckle profile by convolving the profile using an autocorrelation algorithm, then storing the resulting autocorrelation curve information as the template in an auxiliary database.

2. The method as defined in claim 1, further comprising
   f) storing, along with the user's template, unique user data, namely the user's assigned personal identification number, name, Social Security number, or account number.

3. A method according to claim 1, for verifying a user's identity, and then
   g) comparing the user's knuckle profile with the user's previously stored template,
   h) determining the degree of congruence between the user's knuckle profile and template by calculating a numerical match score,
   i) comparing the match score with a predetermined threshold score, and
   j) determining whether the user is to be accepted or rejected based on the magnitude of the match score.

4. A method according to claim 3,
   wherein step j) is based on whether the match score equals or exceeds the threshold score.

5. The method set forth in claim 3 wherein the templates of all authorized users are stored in a database, and step (g) is performed by riffling through such database, comparing the user's knuckle profile with each stored template, and selecting the stored template with the highest match score, and step (i) is performed by comparing the selected template with the threshold score and making an accept decision if the threshold criterion is met.

6. A method according to claim 1, for verifying a user's identity for a number of different users, and then
   e1) storing the digitized knuckle profiles of all users as templates in a database,
   k) searching the database to match the user's profile with the user's previously stored template,
   h1) determining the degree of congruence between the user's profile and a template selected in step k) by calculating a numerical match score,
   i1) comparing the match score with a predetermined threshold score, and
   j1) determining whether the user is to be accepted or rejected based on the magnitude of the match score.

7. A method as defined in claim 1, wherein
   step (b) is performed by an electronic video camera and associated edge detector, said camera generating scan lines sweeping along the knuckle and along the first proximal finger joints, said edge detector extracting the user's knuckle profile from the illuminated fist image and thus generating the knuckle profile.

8. A method as defined in claim 7, wherein a combination of a CCD video camera, an incandescent lamp, and an IR filter are used to insure that high contrast is achieved between the knuckles and surroundings.

9. A method as defined in claim 1, wherein
   step (b) is performed by an electronic video camera and associated edge detector, said camera generating scan lines sweeping along the knuckle and along the back of the hand, said edge detector extracting the user's knuckle profile from the illuminated fist image and thus generating the knuckle profile.

10. The method of claim 1, further including adjusting a threshold score to meet the needs of the facility served, thus relaxing either the Type I error rate or the Type II error rate at the expense of the other.

11. The method set forth in claim 1, further including as step a1) detecting a pulse in the fist to distinguish a living fist from a non-living surrogate.

12. The method set forth in claim 1, wherein the knuckle image is scanned from the head-on position viewing the knuckles and proximal joints of the fist.

13. The method set forth in claim 1, wherein the knuckle image is scanned from above the back of the fist.

14. The method of claim 1, including the additional step of d1) decreasing the size of a profile and template by recording only the distances between the knuckle peaks and valleys and storing such modified profile as a template in an auxiliary database.

15. The method of claim 1, further including
   c2) extracting a profile of the proximal interphalangeal joints in addition to the knuckle profile,
   d2) digitizing the joint profile in addition to the knuckle profile, and
   wherein step (e) stores both the digitized knuckle profile and digitized joint profile as a template.

16. An apparatus for verifying the identity of a candidate user based on a knuckle profile of at least one fist, comprising
   a face plate having a first viewing window therein of a size to accommodate the area of the knuckles of a closed fist,
   a grip handle for the candidate user to grasp so as to bring his fist into position for viewing through said window,
   means mounting said grip handle for pivotable motion about an axis to one side of said window, and for holding said grip handle normally upright, whereby grasping and turning said grip handle to a position in front of said window will locate the fist for viewing through said window,
   profice capturing means mounted so as to view and record through said window an image of the knuckles of a fist, said camera generating a scan-type output waveform signal,
   digitizer means for receiving said output signal and transforming said output signal into a digitized profile of the knuckles, and
   means for storing the digitized profile signals in memory as a template.

17. Apparatus as defined in claim 16, further including a second viewing window located in spaced relation to said first window and said grip handle,
   said mounting means for said grip handle providing for turning of said grip handle to positions in front of either of said first and second windows,
   whereby a user can present his one fist before said first window and his second fist before said second window,
   said camera viewing and scanning the images through said windows in sequence and said digitizer means transforming the two images into a combined output signal for storing as a single template.

18. Apparatus as defined in claim 16, further including
   a card reader/encoder for storing a user's profile waveform signal to be possessed by the user associated therewith.

19. Apparatus as defined in claim 16, further including
   means providing a database memory for storing individually as templates the profile signals from the digitizer means, and
   means for comparing the stored templates with a digitized profile to determine congruence between the profile generated from a user's knuckles and a certain one of the stored templates.

* * * * *